(12) United States Patent
Paulitsch et al.

(10) Patent No.: US 7,889,683 B2
(45) Date of Patent: Feb. 15, 2011

(54) NON-DESTRUCTIVE MEDIA ACCESS RESOLUTION FOR ASYNCHRONOUS TRAFFIC IN A HALF-DUPLEX BRAIDED-RING

(75) Inventors: Michael Paulitsch, Columbia Heights, MN (US); Brendan Hall, Eden Prairie, MN (US); Kevin R. Driscoll, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 928 days.

(21) Appl. No.: 11/556,577

(22) Filed: Nov. 3, 2006

(65) Prior Publication Data

US 2008/0107050 A1 May 8, 2008

(51) Int. Cl.
*G06F 11/00* (2006.01)
*G08C 15/00* (2006.01)
*H04B 1/56* (2006.01)
*H04L 12/56* (2006.01)
*H04L 12/28* (2006.01)

(52) U.S. Cl. .................. 370/258; 370/217; 370/222; 370/395.42; 370/424

(58) Field of Classification Search ......... 370/221–223, 370/258, 403–404, 406, 424, 452, 460
See application file for complete search history.

(56) References Cited

U.S. PATENT DOCUMENTS

| | | | |
|---|---|---|---|
| 4,417,334 A | 11/1983 | Gunderson et al. | |
| 4,428,046 A | 1/1984 | Chari et al. | |
| 4,630,254 A | 12/1986 | Tseng | |
| 4,631,718 A | 12/1986 | Miyao | |
| 4,726,018 A * | 2/1988 | Bux et al. | 370/455 |
| 4,733,391 A * | 3/1988 | Godbold et al. | 370/254 |
| 4,740,958 A | 4/1988 | Duxbury et al. | |
| 4,856,023 A | 8/1989 | Singh | |
| 4,866,606 A | 9/1989 | Kopetz | |
| 4,905,230 A | 2/1990 | Madge et al. | |
| 5,132,962 A | 7/1992 | Hobgood et al. | |

(Continued)

FOREIGN PATENT DOCUMENTS

AT        407582 B       4/2001

(Continued)

OTHER PUBLICATIONS

Al-Rousan et al., "The Two-Processor Reliability of Hierarchical Larg-Scale Ring-Based Networks", "Proceedings of the 29th Hawaii International Conference on System Sciences", 1996, pp. 63-71.

(Continued)

*Primary Examiner*—Warner Wong
(74) *Attorney, Agent, or Firm*—Fogg & Powers LLC

(57) ABSTRACT

A half-duplex communication network comprises a plurality of communication links, each link being configured a priori to communicate in one direction; and a plurality of nodes, each node coupled to a first and second direct neighbor nodes and a first and second skip neighbor nodes via the plurality of communication links. Each node comprises propagation logic adapted to arbitrate conflicts between concurrent messages based on at least one of higher level policies and a comparison between a priority of each message, wherein each node is adapted to communicate a message without waiting to determine if another node is transmitting another message with a higher priority.

18 Claims, 5 Drawing Sheets

U.S. PATENT DOCUMENTS

| | | | |
|---|---|---|---|
| 5,161,153 | A | 11/1992 | Westmore |
| 5,235,595 | A * | 8/1993 | O'Dowd .................... 370/392 |
| 5,257,266 | A * | 10/1993 | Maki .......................... 714/4 |
| 5,307,409 | A | 4/1994 | Driscoll |
| 5,341,232 | A | 8/1994 | Popp |
| 5,383,191 | A | 1/1995 | Hobgood et al. |
| 5,386,424 | A | 1/1995 | Driscoll et al. |
| 5,394,401 | A | 2/1995 | Patrick et al. |
| 5,463,634 | A | 10/1995 | Smith et al. |
| 5,557,778 | A | 9/1996 | Vaillancourt |
| 5,687,356 | A | 11/1997 | Basso et al. |
| 5,715,391 | A | 2/1998 | Jackson et al. |
| 5,742,646 | A | 4/1998 | Woolley et al. |
| 5,896,508 | A | 4/1999 | Lee |
| 5,903,565 | A | 5/1999 | Neuhaus et al. |
| 5,920,267 | A | 7/1999 | Tattersall et al. |
| 5,937,414 | A | 8/1999 | Souder et al. |
| 5,940,367 | A * | 8/1999 | Antonov .................... 370/218 |
| 6,052,753 | A | 4/2000 | Doerenberg et al. |
| 6,172,984 | B1 * | 1/2001 | Beyda et al. ............... 370/448 |
| 6,175,553 | B1 | 1/2001 | Luk et al. |
| 6,219,528 | B1 | 4/2001 | Wright et al. |
| 6,226,676 | B1 | 5/2001 | Crump et al. |
| 6,374,078 | B1 | 4/2002 | Williams et al. |
| 6,414,953 | B1 | 7/2002 | Lamarche et al. |
| 6,513,092 | B1 | 1/2003 | Gorshe |
| 6,594,802 | B1 | 7/2003 | Ricchetti et al. |
| 6,618,359 | B1 | 9/2003 | Chen et al. |
| 6,707,913 | B1 | 3/2004 | Harrison et al. |
| 6,741,559 | B1 * | 5/2004 | Smeulders et al. .......... 370/230 |
| 6,760,768 | B2 | 7/2004 | Holden et al. |
| 6,765,924 | B1 | 7/2004 | Wu et al. |
| 6,842,617 | B2 | 1/2005 | Williams et al. |
| 6,925,497 | B1 | 8/2005 | Vetrivelkumaran et al. |
| 6,956,461 | B2 | 10/2005 | Yoon et al. |
| 7,035,539 | B2 * | 4/2006 | Gumaste ...................... 398/57 |
| 7,050,395 | B1 | 5/2006 | Chow et al. |
| 7,085,560 | B2 | 8/2006 | Petermann |
| 7,088,921 | B1 | 8/2006 | Wood |
| 7,269,177 | B2 * | 9/2007 | Baker ......................... 370/403 |
| 7,349,414 | B2 * | 3/2008 | Sandstrom .................. 370/406 |
| 7,372,859 | B2 | 5/2008 | Hall et al. |
| 7,457,303 | B2 * | 11/2008 | Blumrich et al. ............ 370/406 |
| 7,502,334 | B2 | 3/2009 | Hall et al. |
| 2002/0027877 | A1 * | 3/2002 | Son et al. .................... 370/218 |
| 2002/0087763 | A1 | 7/2002 | Wendorff |
| 2002/0118636 | A1 * | 8/2002 | Phelps et al. ................ 370/222 |
| 2003/0002435 | A1 | 1/2003 | Miller |
| 2003/0067867 | A1 * | 4/2003 | Weis .......................... 370/210 |
| 2003/0128984 | A1 | 7/2003 | Oberg et al. |
| 2004/0073698 | A1 | 4/2004 | Harter et al. |
| 2004/0223515 | A1 | 11/2004 | Rygielski et al. |
| 2004/0258097 | A1 | 12/2004 | Arnold et al. |
| 2005/0002332 | A1 * | 1/2005 | Oh ............................ 370/229 |
| 2005/0132105 | A1 | 6/2005 | Hall et al. |
| 2005/0135277 | A1 | 6/2005 | Hall et al. |
| 2005/0135278 | A1 | 6/2005 | Hall et al. |
| 2005/0152377 | A1 | 7/2005 | Hall et al. |
| 2005/0169296 | A1 * | 8/2005 | Katar et al. ................. 370/445 |
| 2005/0198280 | A1 | 9/2005 | Hall et al. |
| 2006/0077981 | A1 | 4/2006 | Rogers |
| 2006/0203851 | A1 | 9/2006 | Eidson |
| 2008/0080551 | A1 | 4/2008 | Driscoll et al. |
| 2008/0144526 | A1 | 6/2008 | Hall et al. |
| 2008/0144668 | A1 | 6/2008 | Hall et al. |
| 2009/0072268 | A1 * | 3/2009 | Hatori et al. ................ 257/133 |
| 2009/0086653 | A1 | 4/2009 | Driscoll et al. |

FOREIGN PATENT DOCUMENTS

| | | |
|---|---|---|
| DE | 3238692 | 4/1984 |
| DE | 19633744 | 2/1998 |
| DE | 20220280 | 11/2003 |
| EP | 0405706 | 2/1990 |
| EP | 1280024 | 1/2003 |
| EP | 1280312 | 1/2003 |
| EP | 1365543 | 11/2003 |
| EP | 1398710 | 3/2004 |
| EP | 1469627 | 10/2004 |
| GB | 2028062 | * 8/1979 |
| GB | 2028062 | 2/1980 |
| GB | 1581803 | 12/1980 |
| GB | 2175775 | 12/1986 |
| WO | 0064122 | 10/2000 |

OTHER PUBLICATIONS

"Backplane Data Bus Arinc Specification 659", Dec. 1993, pp. 1-132, Publisher: Arinc.

Avizienis, "A Fault Tolerance Infrastructure for Dependable Computing With High-Performance COTS Componenets", "Conference Proceedings on Dependable Systems and Networks", Jun. 2000, pp. 492-500, Publisher: IEEE, Published in: New York, NY.

Bauer et al., "Assumption Coverage Under Different Failure Modes in the Time-Triggered Architecture", "8th IEEE International Conference on Emerging Technologies and Factory Automation", Oct. 2001, pp. 333-341, Publisher: IEEE.

Bauer et al., "Transparent Redundancy in the Time-Triggered Architecture", "Proceedings of the Conference on Dependable Systems and Networks", 2000, pp. 5-13, Publisher: IEEE.

Bauer et al., "The Central Guardian Approach to Enforce Fault Isolation in a Time-Triggered System", "Proceedings of Symposium on Autonomous Decentralized Systems", Apr. 2003, pp. 37-44, Publisher: IEEE.

Bosch, "Can Specification Version 2.0", "SAE Handbook—Parts and Components", 1998, pp. 1-72, vol. 2, Publisher: Society of Automotive Engineers.

D'Luna, "A Single-Chip Universal Cable Set-Top Box/Modem Transceiver", "Journal of Sold-State Circuits", Nov. 1998, pp. 1647-1660, vol. 34, No. 11, Publisher: IEEE.

Driscoll et al., "The Real Byzantine Generals ", "Proceedings of Digital Avionics System Conference", Oct. 2004, pp. 6.D.4-1-6.D.4-11, Publisher: IEEE.

Brinkmeyer, "Flexray International Workshop Slides", "www.flexray-group.com", Apr. 2002, pp. 1-356, Publisher: Flexray.

"Flexray Communication System: Protocol Specification Version 2.1 Revision A", "www.flexray-group.com", Mar. 2006, pp. 1-8, Publisher: Flexray Consortium.

"Preliminary Node-Local Bus Guardian Specification Version 2.0.9", Dec. 2005, pp. 1-75, Publisher: Flexray Consortium.

"Preliminary Central Bus Guardian Specification Version 2.0.9", Dec. 2005, pp. 1-38, Publisher: Flexray Consortium.

Grnarov et al., "A Highly Reliable Distributed Loop Network Architecture", "Proceedings of Fault-Tolerant Computing Symposium", Jun. 1980, pp. 319-324, Publisher: IEEE.

Gruenbacher, "Fault Injection for TTA", 1999, Publisher: Information Society Technologies.

Hall et al., "Ringing Out Fault Tolerance a New Ring Network for Superior Low-Dost Dependabilitiy", "International Conference on Dependable Systems and Networks (DSN'05)", 2005, pp. 298-307.

Hammett et al., "Achieving 10-9 Dependability With Drive-By-Wire Systems", "SAE World Congress", 2003, pp. 534-547, vol. 112, No. 7, Publisher: Society of Automotive Engineers.

Hopper et al., "Design and Use of an Integrated Cambridge Ring", "Journal on Selected Areas in Communications", Nov. 2003, pp. 775-784, vol. 1, No. 5, Publisher: IEEE.

Hoyme et al., "SAFEbus", "Proceedings of the Digital Avionics Systems Conference", Oct. 1992, pp. 68-73, Publisher: IEEE.

Hoyme et al., "Safebus ", "IEEE Aerospce and Electronics Systems Magazine", Mar. 1993, pp. 34-39, vol. 8, No. 3, Publisher: IEEE.

Huber et al., "Silk: An Implementation of a Buffer Insertion Ring", "Journal on Selected Areas in Communications", Nov. 1983, pp. 766-774, vol. 1, No. 5, Publisher: IEEE.

Hwang et al., "Survival Reliability of Some Double-Loop Networks and Chordal Rings", "Transactions on Computers", 1995, pp. 1468-1471, vol. 44, No. 12, Publisher: IEEE.

"Internet Content Adaptation", "Network Appliance", Jul. 2001, pp. 1-13.

IEEE Computer Society, "1149.6 IEEE Standard for Boundary-Scan Testing of Advanced Digital Networks", Apr. 17, 2003, pp. 1-139, Publisher: IEEE, Published in: New York, NY.

Johansson et al., "On Communication Requirements for Control-By-Wire Applications", "Proceedings of System Safety Conference", Aug. 2003, pp. 1123-1132.

Kanoun et al., "Dependability Evaluation of Bus and Ring Communication Topologies for the Delta-4 DISTR Fault-Tolerant Architecture", "Proceedings of the Symposium on Reliable Distributed Systems", 1991, pp. 130-141, Publisher: IEEE.

Kieckhafer et al., "The MAFT Architecture for Distributed Fault Tolerance ", "Transactions on Computers", 1988, pp. 398-405, vol. 37, No. 4, Publisher: IEEE.

Kopetz et al., "TTP—A Protocol for Fault-Tolerant Real-Time Systems", "Computer", Jan. 1194, pp. 14-23, vol. 27, No. 1, Publisher: IEEE Computer Society, Published in: Long Beach, CA.

Liu et al., "The Distributed Double-Loop Computer Network (DDLCN)", "ACM '80 Proceedings of the ACM 1980 Annual Conference", 1980, pp. 164-178, Publisher: ACM.

Lonn, "Initialsynchronization of TDMA Communication in Distributed Real-Time Systems", "Conference on Distributed Computing Systems", 1999, pp. 370-379, Publisher: IEEE.

Nayak et al., "Ring Reconfiguration in Presence of Close Fault Cuts", "Proceedings of Hawaii International Conference on System Science", 1996, pp. 422-428, Publisher: IEEE.

Paulitsch et al., "Cverage and the Use of Cyclic Redundancy Codes in Ultra-Dependable Systems", "2005 International Conference on Dependable Systems and Networks (DSN'05)", 2005, pp. 346-355.

Poledna et al., "Replica Determinism and Flexible Scheduling in Hard Real-Time Dependable Systms", "IEEE Transactions on Computers", Feb. 2000, pp. 100-111, vol. 49, No. 2, Publisher: IEEE.

Poledna, "Replica Determinism in Distributed Real-Time Systems: A Brief Survey", "Real-Time Systems", 1994, pp. 289-316, vol. 6.

"Software Considerations in Airborne Systems and Equipment Certification", "http://www.rtca.org", Dec. 1992, pp. 1-112, Publisher: RTCA.DO-178b.

Rushby, "Bus Architectures for Safety-Critical Embedded Systems, Embedded Software", "Proceedings of 1st International Workshop on Embedded Software, Notes in Computer Science", Oct. 2001, pp. 306-323, vol. 2211, Publisher: Springer-Verlag, Published in: Germany.

Saltzer et al., "Why a Ring", "Proceedings of Symposium on Data Communications", 1981, pp. 211-217, Publisher: IEEE.

Sivencrona et al., "Protocol Membership Agreement in Distributed Communicaiton System—A Question of Brittleness", "SAE World Congress, Paper No. 2003-01-0108", 2003, pp. 1-6, Publisher: Society of Automotive Engineers Inc.

Steiner et al., "The Startup Problem in Fault-Tolerant Time-Triggered Communication", "International Conference on Dependable Systems and Networks (DSN'06)", 2006, pp. 35-44.

Steiner et al., "The Transition From Asynchronous to Synchronous System Operation: An Approach From Distributed Fault-Tolerant Systems", "Proceedings of Conference on Distributed Computing Systems", Jul. 2002, pp. 329-336, Publisher: IEEE.

Sundaram et al., "Controller Integrity in Automotive Failsafe System Architectures", "2006 SAE World Congress", 2006, pp. 1-10, Publisher: SAE International.

Tomlinson et al., "Extensible Proxy Services Framework", Jul. 2000, pp. 1-13, Publisher: Internet Society.

"Time-Triggered Protocol TTP/C", 2004, Publisher: TTTECH Computertechnik GmbH, Published in: Austria.

Wensley et al., "The Design, Analysis, and Verification of the Sift Fault Tolerant System", "Proceedings of Conference on Software Engineering", 1976, pp. 458-469, Publisher: IEEE Computer Society Press.

Yeh, "Design Condiserations in Boeing 777 Fly-By-Wire Computers", "High-Assurance Systems Engineering Symposium", Nov. 1998, pp. 64-72, Publisher: IEEE.

Yeh, "Triple-Triple Redundant 777 Primary Flight Computer", "Proceedings of the Aerospace Applications Conference", 1996, pp. 293-307, vol. 1, Publisher: IEEE, Published in: New York, NY.

* cited by examiner

NON-DESTRUCTIVE MEDIA ACCESS RESOLUTION FOR ASYNCHRONOUS TRAFFIC IN A HALF-DUPLEX BRAIDED-RING

CROSS REFERENCE TO RELATED APPLICATIONS

This application is related to co-pending U.S. patent application Ser. No. 10/993,933, filed Nov. 19, 2004 entitled "HIGH INTEGRITY DATA PROPAGATION IN A BRAIDED RING", hereby incorporated herein by reference, and referred to herein as the "'933 application".

This application is related to co-pending U.S. patent application Ser. No. 11/537,305, filed on Sep. 29, 2006, entitled "SYSTEMS AND METHODS FOR FAULT-TOLERANT HIGH INTEGRITY DATA PROPAGATION USING A HALF-DUPLEX BRAIDED RING NETWORK", hereby incorporated herein by reference, and referred to herein as the "'9502 Application".

BACKGROUND

Braided-ring networks have many advantages in speed of message propagation and fault protection. A braided-ring network can be used to propagate both synchronous and asynchronous traffic. However, in a typical bi-directional half-duplex braided ring network, as in other bi-directional half-duplex networks, some type of scheduling or arbitration mechanism must be used to prevent signals or messages from different nodes colliding on links or otherwise creating interference with each other.

It is also desirable for the mechanism used to limit delay as well as prevent collisions. In other words, it is desirable for a message to be transmitted as soon as possible once it is ready to be transmitted without having to wait excess time to be transmitted. Typical mechanisms to prevent collisions do not adequately address this time delay concern. Traditionally, asynchronous traffic has used mini-slotting wherein each node waits a fixed timed period based on node priority before transmitting a message even when other nodes are not currently transmitting a message. In serialized topologies such as rings, the disadvantages of mini-slotting schemes are further amplified as the slots need to be widened to account for the serialization/repeat delay. Similarly, requiring the nodes to communicate and coordinate transmission utilizes bandwidth and time which could be used for transmission of messages.

SUMMARY

The above-mentioned problems and other problems are resolved by the present invention and will be understood by reading and studying the following specification.

In one embodiment, a half-duplex communication network is provided. The half-duplex communication network comprises a plurality of communication links, each link being configured a priori to communicate in one direction; and a plurality of nodes, each node coupled to a first and second direct neighbor nodes and a first and second skip neighbor nodes via the plurality of communication links. Each node comprises propagation logic adapted to arbitrate conflicts between concurrent messages based on at least one of higher level policies and a comparison between a priority of each message, wherein each node is adapted to communicate a message without waiting to determine if another node is transmitting another message with a higher priority.

DRAWINGS

The present invention can be more easily understood and further advantages and uses thereof more readily apparent, when considered in view of the description of the embodiments and the following figures in which.

Like reference numbers and designations in the various drawings indicate like elements.

DETAILED DESCRIPTION

Figure 1:
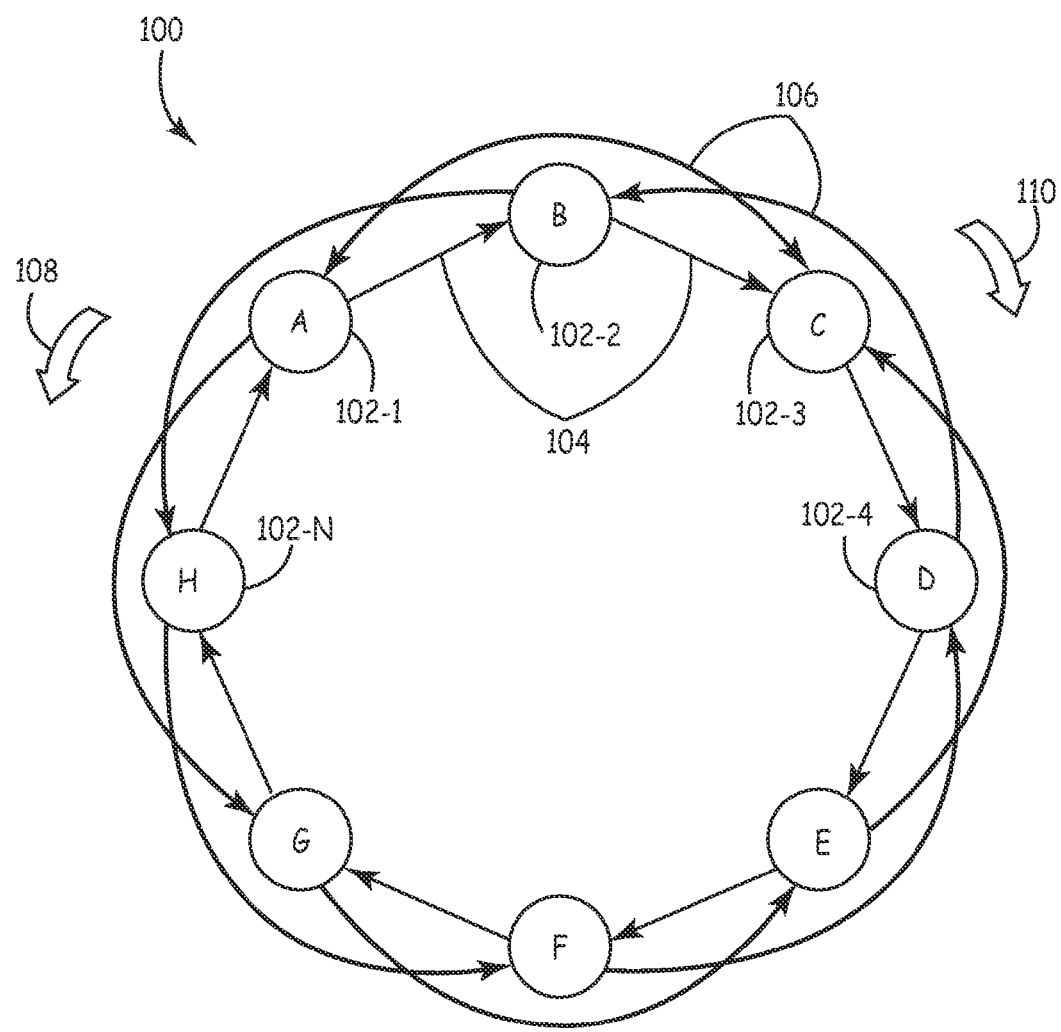
FIG. 1 is a high level block diagram of a half-duplex communication network according to one embodiment of the present invention.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. It should be understood that the exemplary methods illustrated may include additional or fewer steps or may be performed in the context of a larger processing scheme. Furthermore, the methods presented in the drawing figures or the specification are not to be construed as limiting the order in which the individual steps may be performed. The following detailed description is, therefore, not to be taken in a limiting sense.

Embodiments of the present invention enable more efficient resolution of media access for asynchronous traffic transmissions in a network, such as a braided-ring network. In particular, embodiments of the present invention enable nodes in a network to transmit asynchronous messages without waiting to coordinate transmission with other nodes in the network. This decreases the delay to transmit a message and hence, uses resources more efficiently.

Instructions for carrying out the various process tasks, calculations, and generation of signals and other data used in the operation of the systems and methods of the invention can be implemented in software, firmware, or other computer readable instructions. These instructions are typically stored on any appropriate computer readable medium used for storage of computer readable instructions or data structures. Such computer readable media can be any available media that can be accessed by a general purpose or special purpose computer or processor, or any programmable logic device.

Suitable computer readable media may comprise, for example, non-volatile memory devices including semiconductor memory devices such as EPROM, EEPROM, or flash memory devices; magnetic disks such as internal hard disks or removable disks (e.g., floppy disks); magneto-optical disks; CDs, DVDs, or other optical storage disks; nonvolatile ROM, RAM, and other like media. Any of the foregoing may be supplemented by, or incorporated in, specially-designed application-specific integrated circuits (ASICs). When information is transferred or provided over a network or another communications connection (either hardwired, wireless, or a combination of hardwired or wireless) to a computer, the computer properly views the connection as a computer readable medium. Thus, any such connection is properly termed a computer readable medium. Combinations of the above are also included within the scope of computer readable media.

It should be noted that variations of the term "forward" are used in various places in the description and refer to the act of sending a message or part of a message from a node wherein the message or part of the message originated at another node and was received over an input link. Variations of the term "transmit" are also used in various places in the description and refer to the act of sending a message or part of a message from a node wherein the message or part of that message originated from that node. In addition, variations of the term "communicate" refer to the act of either forwarding or transmitting a message. Also, the term "a priori" is used in various places in the description and refers to something that is known or created at design time, as opposed to execution or run time.

FIG. 1 is a high level block diagram of a bi-directional half-duplex communication network 100 according to one embodiment of the present invention. In this example, network 100 employs a braided-ring topology. Network 100 includes nodes 102-1 . . . 102-N (e.g. nodes A-G), where N is the total number of nodes. Although 8 nodes are shown in FIG. 1, it is to be understood that any number of nodes may be used in other embodiments of the present invention. Each of nodes 102-1 . . . 102-N is coupled to its two immediate neighbors (also referred to herein as direct neighbors) via direct links 104 and to its neighbors' neighbor (also referred to herein as skip neighbors) via skip links 106.

In order to prevent a collision of data on the ring network, an agreement between two nodes on the same link needs to exist. In this example, the direct links 104 are configured a priori to communicate (e.g. carry transmission) in a first direction 108 and the skip links 106 are configured a priori to communicate in a second direction 110. Hence two links are used for input from other nodes and two are used for output. However, in other embodiments, other configurations are used for the communication direction of direct links 104 and skip links 106. For example, in another embodiment, skip links 106 and direct links 104 are configured a priori to communicate in the same direction (e.g. first direction 108). By configuring direct links 104 and skip links 106 to communicate in one direction, messages can only travel in one direction on any given link and collision of messages on the links is avoided.

In addition to avoiding collisions on the links, nodes 102-1 . . . 102-N are adapted to arbitrate between messages being concurrently propagated in network 100. Each of nodes 102-1 . . . 102-N embeds its priority in a priority field at the beginning of each message originating from the respective nodes. When a node arbitrates between two different messages, the node compares the priority located in the priority field of each message. The message with the higher priority is transmitted or forwarded while the lower priority message is preempted or blocked. As used herein, a node transmits messages originating from itself and forwards messages originating from other nodes.

Collisions are avoided on links 104 and 106 due to the disjoint message paths. The disjoint message paths in turn allow for arbitration at nodes 102-1 . . . 102-N. Hence, embodiments of the present invention enable each of nodes 102-1 . . . 102-N to transmit a message once each node is ready to transmit without waiting to determine if a node with a higher priority is also transmitting. In addition, embodiments of the present invention enable nodes 102-1 . . . 102-N to forward a message with minimal (e.g. a couple of bit cells delay due to processing the message) to no delay unless required to arbitrate between messages. That is, if not currently forwarding a message, nodes 102-1 . . . 102-N begin sending a message immediately upon having a message to send. In addition, if not currently forwarding a message, nodes 102-1 . . . 102-N forward a message immediately upon receipt. Sending and forwarding in such circumstances is done on a bit-for-bit basis in some embodiments. Alternatively, sending and forwarding messages can be done in other incremental steps such as byte-for-byte or word-for-word. Collisions are avoided on links 104 and 106 due to configuration of link directions and each of nodes 102-1 . . . 102-N is adapted to arbitrate between messages if another message is received at the same node while currently forwarding or sending a message.

FIGS. 2A-2D are high level block diagrams showing operation of a half-duplex communication network 200 according to one embodiment of the present invention. As described above, network 200 in FIGS. 2A-2D includes nodes 202-1 . . . 202-N, direct links 204-1 . . . 204-N, and skip links 206-1 . . . 206-N. Each of nodes 202-1 . . . 202-N is coupled to its direct neighbors and skip neighbors via direct links 204-1 . . . 204-N and skip links 206-1 . . . 206-N, respectively. Each of direct links 204-1 . . . 204-N and skip links 206-1 . . . 206-N is configured to carry transmissions in one direction when operating in asynchronous mode. By only carrying transmissions in one direction, collisions on the links are avoided as described above. However, for purposes of clarity and explanation, direct links 204-1 . . . 204-N and skip links 206-1 . . . 206-N are only shown in FIGS. 2A-2D when carrying a message.

Additionally, each of nodes 202-1 . . . 202-N is enabled to begin transmission of a message whenever not currently forwarding a message without waiting to determine if a higher priority node is transmitting. In addition, in some embodiments, each of nodes 202-1 . . . 202-N may preempt a message it is currently forwarding if its message to transmit has a higher priority than the message currently being forwarded.

In this example, each message sent by nodes 202-1 . . . 202-N is pre-configured with a priority. However, it is to be understood that in other embodiments, priorities can be assigned and changed dynamically, such as through the use of tokens as known to one of skilled in the art. The assignment of a message's priority can be based on higher level policies, message type (e.g. status as real-time data, voice data, system statistics, etc.), and priority of the message's originating node. Higher level policies can include, but are not limited to, bandwidth allocations, and each node's sending frequency, etc. The assignment of the priority is performed a priori and remains static in some embodiments. Alternatively, the priority can change dynamically between different sending attempts so that messages from the same sending node may have different priorities at different times. Such dynamic assignments can be agreed upon a priori or coordinated between the nodes dynamically such that the priorities of messages are different if intended for different nodes to ensure correct arbitration.

Figure 2A:
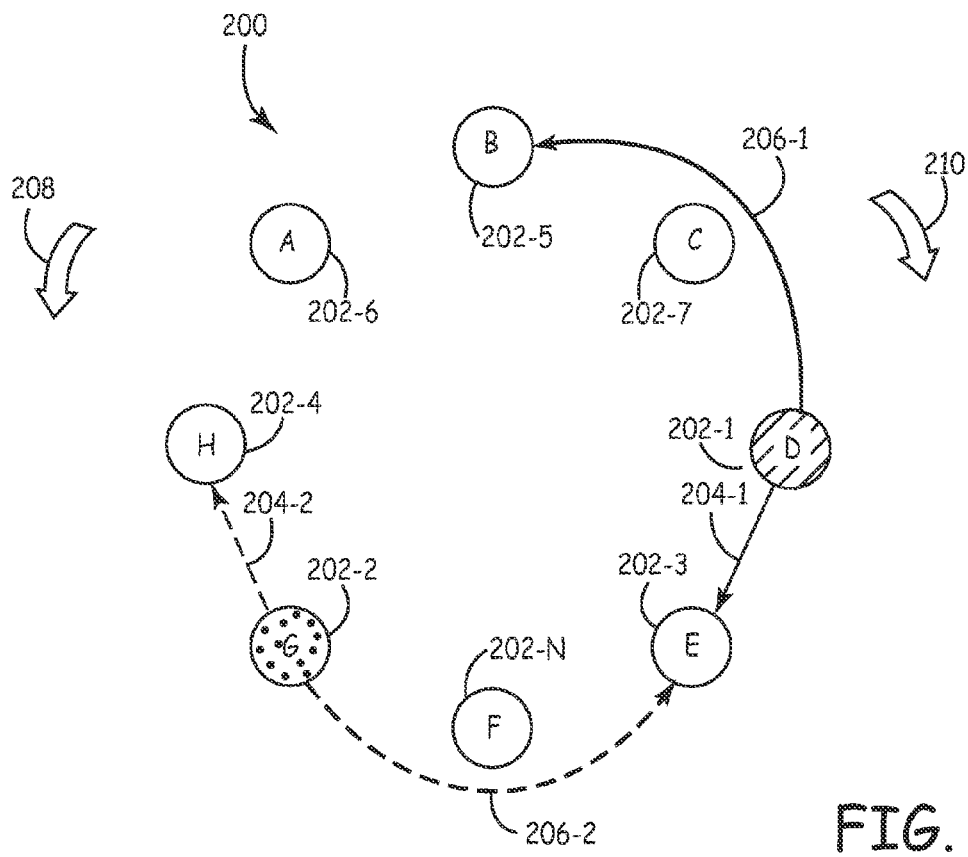
FIGS. 2A-2D are high level block diagrams showing operation of a half-duplex communication network according to one embodiment of the present invention.

As can be seen in FIGS. 2A-2D, each of nodes 202-1 . . . 202-N has one direct input link, one direct output link, one skip input link, and one skip output link. In this example, direct links 204-1 . . . 204-N are configured to carry communication in direction 210 while skip links 206-1 . . . 206-N are configured to carry communication in direction 208. In FIG. 2A nodes 202-1 and 202-2 are ready to begin transmitting a message. In this example, node 202-1 has a higher assigned priority than node 202-2. Nodes 202-1 and 202-2 embed their respective priority in a priority field in the message and begin transmission at approximately the same time. In particular, node 202-1 transmits a message on direct link 204-1 and on skip link 206-1. Node 202-2 transmits on direct link 204-2 and on skip link 206-2. Notably, although each node's priority is discussed, in this example, it is to be understood that in other embodiments, the priority of a message is based on other criteria, such as the message type (e.g. real time data, background statistics, etc.) or the amount of time the message has been waiting to be transmitted.

Since node 202-3 receives the message from node 202-1 over direct link 204-1 and the message from node 202-2 over skip link 206-2, node 202-3 must arbitrate between the two messages. In one embodiment, Node 202-3 stores received segments of each message until it has received the priority field for each message. For example, node 202-3 stores the header of each message and a number of data bits from each message. Once it has received the priority fields, node 202-3 compares the priority of each message. Alternatively, node 202-3 can begin forwarding one of the two messages arbitrarily until the priority field of each of the two messages is received. In such embodiments, node 202-3 stores received segments of the message not being forwarded, such as the header and data bits of the non-forwarded message. The number of data bits stored is proportional to the amount of time needed to receive the priority fields and pre-empt the message being forwarded. Once the priority fields are received, node 202-3 compares the priority of each message and pre-empts the message being forwarded if it has a lower priority than the other message. If the message being forwarded is pre-empted, node 202-3 forwards the other message beginning with the stored header and data bits.

Figure 2B:
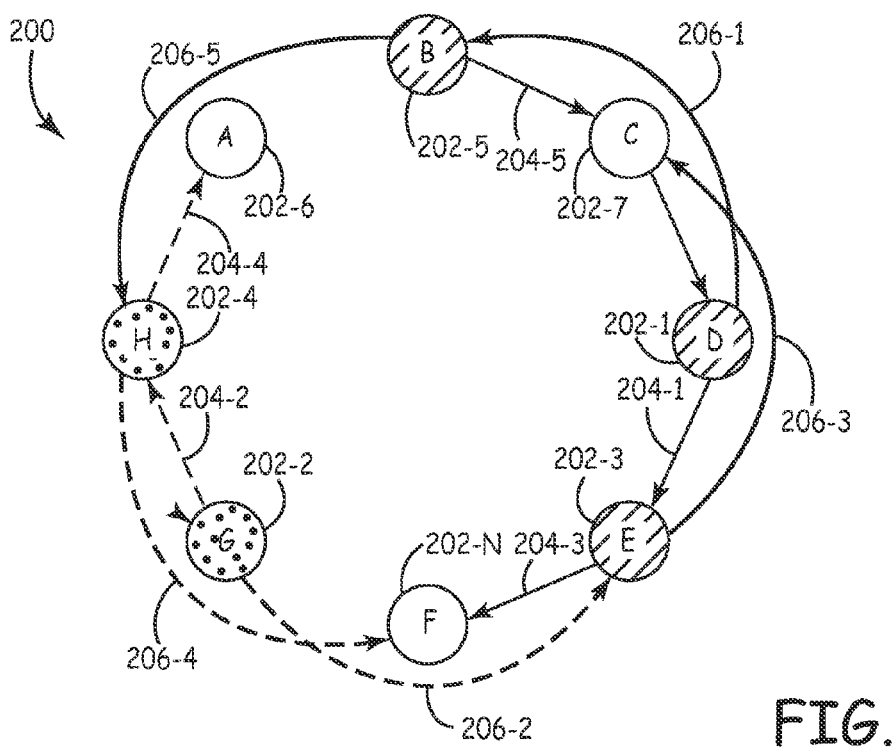

Since node 202-1 has a higher priority, node 202-3 blocks propagation of the message from node 202-2 and begins forwarding the message from node 202-1 as shown in FIG. 2B. Node 202-4, however, only receives the message from node 202-2 over direct link 204-2. Therefore, node 202-4 does not need to wait for the priority field to arrive and begins forwarding the message from node 202-2 as shown in FIG. 2B. Similarly, node 202-5 only receives the message from node 202-1 over skip link 206-1. Node 202-5 does not wait for the priority field to arrive and begins forwarding the message from node 202-1 as shown in FIG. 2B.

In FIG. 2B, node 202-3 forwards the message over direct link 204-3 and skip link 206-3, node 202-4 forwards the message over direct link 204-4 and skip link 206-4, and node 202-5 forwards the message over direct link 204-5 and skip link 206-5. Node 202-4 receives from node 202-5 over skip link 206-5 the message originating at node 202-1. Since node 202-4 is currently forwarding the message originating from node 202-2, node 202-4 arbitrates between the two messages based on the node priority of the originating nodes (i.e. nodes 202-1 and 202-2, in this example). Since node 202-5 is forwarding the message, it forwards the priority of node 202-1 and stores the priority of node 202-1 in case it needs to arbitrate in the future. Node 202-4 also stores the priority of node 202-2 and compares the stored priority to the priority of the message from node 202-5, once node 202-4 receives the priority field. Since node 202-1 has a higher priority, node 202-4 preempts the message being received over direct link 204-2 from node 202-2 and begins forwarding the message originating at node 202-1 in FIG. 2C.

When a message is pre-empted, notification of the pre-emption is provided in some embodiments. For example, the pre-emption can be signaled on the line encoding layer. In other words, it is announced that the message has been pre-empted and the next message is sent with its priority embedded in the priority field. In addition, in some embodiments, a node which pre-empts a message is configured to resend the pre-empted message from the point at which is was pre-empted once the node is no longer forwarding or sending a higher priority message. Alternatively, an originating node of a pre-empted message can be notified of the pre-emption and begin re-transmitting the pre-empted message when appropriate.

Node 202-N receives the forwarded message from node 202-3 and the forwarded message from node 202-4 and arbitrates between the two messages. As with node 202-3, node 202-N compares the priorities and begins forwarding the message forwarded from node 202-3 while blocking propagation of the message from node 202-4 since node 202-1 has a higher priority than node 202-2.

Node 202-7 receives a forwarded message from both nodes 202-5 and 202-3 over direct link 204-5 and skip link 206-3, respectively. After waiting to receive the priority field of each message, node 202-7 selects either message since the forwarded messages both originated at node 202-1 with the same priority. In this example, node 202-7 selects the message that arrived first in time. If the two messages arrived at the same time, node 202-7 selects a default input link which is direct link 204-5 in this example. Alternatively, node 202-7 can begin forwarding one of the two messages arbitrarily. Once the priority field of each message is received, node 202-7 can compare the priorities of each message and pre-empt the message being forwarded if it has a lower priority than the other. Since both messages originated at node 202-1 node 202-7 then continues forwarding the same message.

Figure 2C:
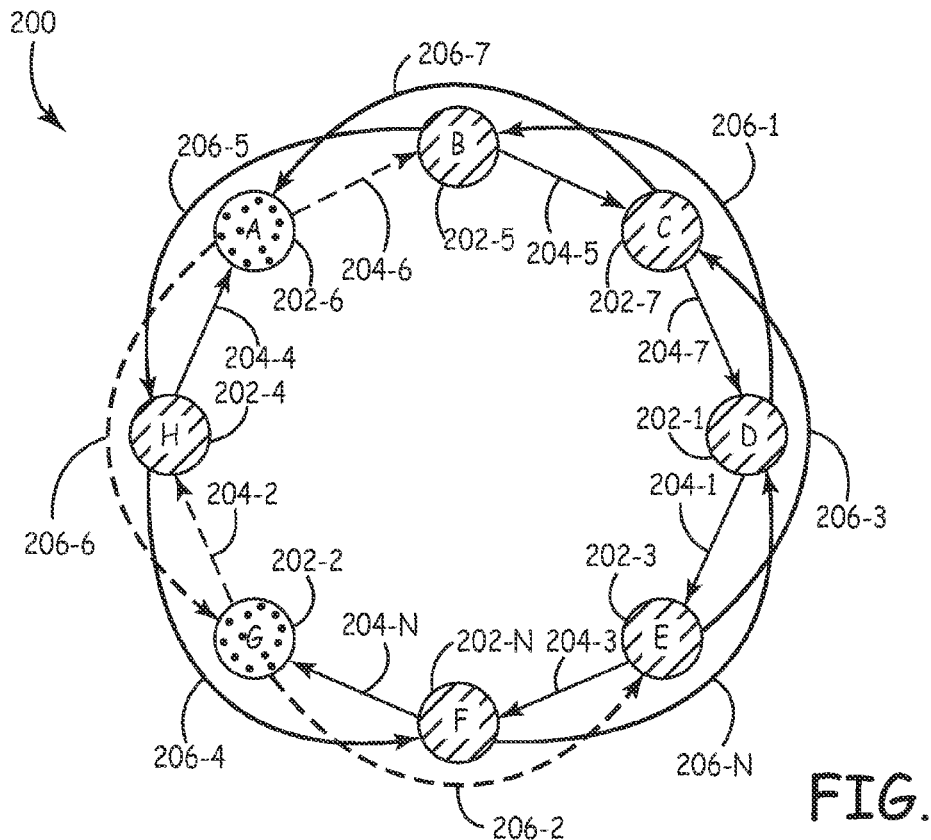

Since node 202-6 only receives a forwarded message over direct link 204-4, node 202-6 begins forwarding the message in FIG. 2C without waiting for the priority field to arrive. Once the priority field arrives, node 202-6 saves the priority for use in future arbitration. The message being forwarded by node 202-6 in FIG. 2C is the message originating from node 202-2 since node 202-4 forwarded that message to node 202-6 prior to preempting the message from node 202-2.

In FIG. 2C, node 202-2 receives the forwarded message originating at node 202-1 over direct link 204-N. Once receiving the priority field, node 202-2 compares the priorities and preempts the message it is transmitting to begin forwarding the message from node 202-1 since node 202-1 has a higher priority. Similarly, node 202-6 receives the forwarded message originating at node 202-1 over skip link 206-7 and direct link 204-4. Since node 202-6 is currently forwarding a message received over direct link 204-4, in this example, node 202-6 begins forwarding the message originating at node 202-1 without having to arbitrate since node 202-4 has stopped forwarding the message originating at node 202-2 in favor of the message originating at node 202-1.

Figure 2D:
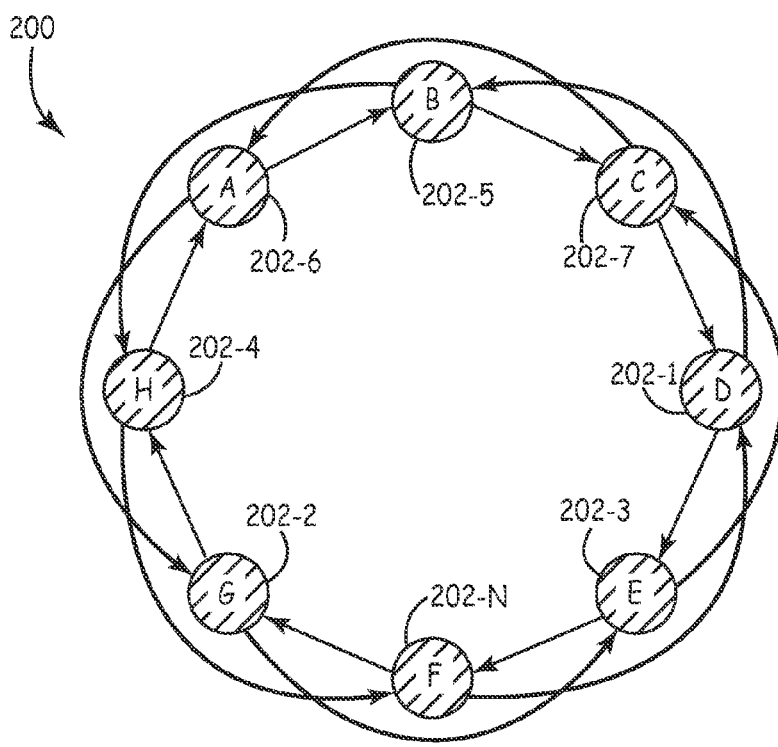

Node 202-1 receives the forwarded messages from node 202-7 and 202-N over direct link 204-7 and skip link 206-N, respectively. Since node 202-1 is the originating node, it blocks further forwarding of the message and continues to transmit the original message. As seen in FIG. 2D, each of nodes 202-2 . . . 202-N is now forwarding the message originating from node 202-1. In this example, the message was propagated to each nodes 202-2 . . . 202-N quickly due in part to configuring skip links 206-1 . . . 206-N to carry communication in direction 210 and direct links 204-1 . . . 204-N to carry communication in direction 208. Once node 202-1 finishes transmission of its message, each of nodes 202-1 . . . 202-N is able to begin transmitting a message once each has finished forwarding the message originating from node 202-1.

Figure 3:
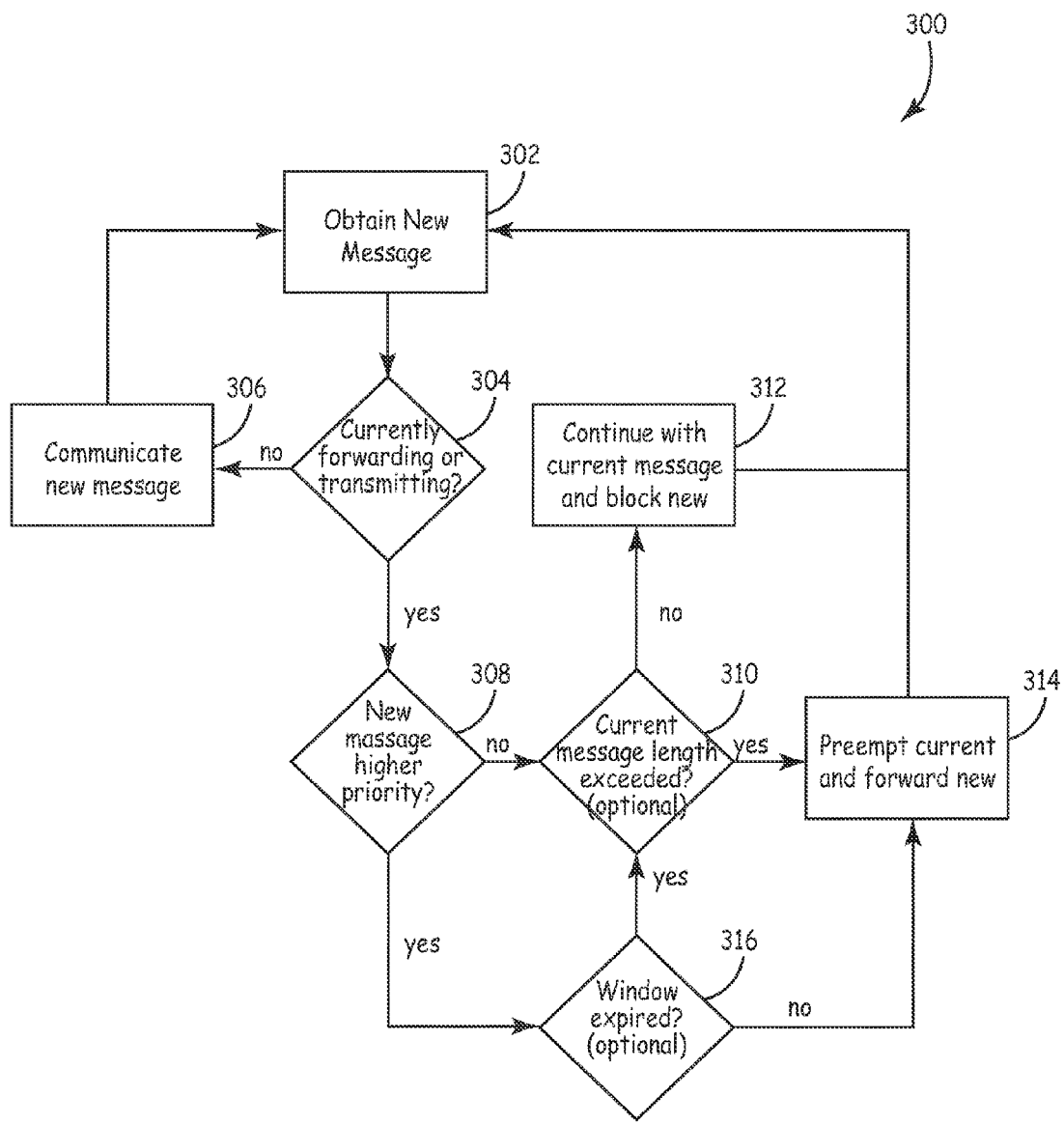
FIG. 3 is a flow chart showing a method of arbitrating messages in a half-duplex network node according to one embodiment of the present invention.

FIG. 3 is a flow chart showing a method 300 of arbitrating messages in a half-duplex network node (e.g. nodes 102-1 . . . 102-N in FIG. 1) according to one embodiment of the present invention. At 302, a node obtains a new message to be communicated over the node's output links. The new message can be received over at least one input link (e.g. skip link 106 or direct link 104 in FIG. 1) or can be a new message originating at the node. At 304, the node determines if it is already forwarding a message from another node or if it is currently transmitting a message. If it is not currently forwarding or transmitting a message, the node begins communicating the new message at 306 (e.g. the node begins forwarding a new message received over an input link or transmitting a new message originating at the node). Hence, the node is able to immediately begin forwarding a message with minimal delay for processing the new message. Similarly, if the node is ready to transmit a new message at 302, the node can begin to transmit immediately with minimal processing delay if not currently forwarding a message. This is an advantage enabled by embodiments of the present invention, because the node does not have to wait to determine if another node is transmitting a message with a higher priority. In addition, in some embodiments, a node is able to preempt a message it is currently forwarding if the node's message has a higher priority than the priority of a currently forwarded message. In one embodiment, the ability to preempt is gated by a timeout, which is restarted at the start of forwarding or sending a message as described below.

As discussed above, the priority of each message is embedded in the priority field by its originating node. If the node is currently forwarding or transmitting a message, the node will store received segments of the second message until the priority field is received. At 308, once the priority field is received, the node will compare the priority of the new message with the priority of the message currently being forwarded or transmitted. Each node may assign a priority based on higher level policies, message type (e.g. real-time data, voice data, system statistics, etc.), and priority of the message's originating node. Such higher level policies can include, but are not limited to, bandwidth allocations, and each node's sending frequency, etc.

If the node determines at 308 that the priority of the second message is not higher than the priority of the message currently being forwarded or transmitted, the node determines at 310 if the maximum message length of the message currently being forwarded or transmitted has been exceeded. The node determines if the maximum message length has been exceeded by tracking how many bits of the message have been transmitted. Once the maximum number of bits has been transmitted, the message has exceeded the maximum message length. This check prevents a long message from utilizing the output links for too much time despite having a higher priority. In some embodiments, the maximum message length can be the same for all nodes. Alternatively, the maximum message length can be based on message priority. The check at 310 is optional and not used in some embodiments. If the maximum message length has not been exceeded or the check at 310 is not used, the node continues to forward or transmit the current message and blocks transmission of the new message at 312. Method 300 then returns to 302 when another new message is obtained. If the maximum message length has been exceeded at 310, the node preempts the current message and begins forwarding the new message at 314. Method 300 then returns to 302 when another new message is obtained.

In this example, if it is determined at 308 that the priority of the new message is higher than the priority of the message currently being transmitted or forwarded, the node determines at 316 if the arbitration window for preempting the current message has expired. The arbitration window is a fixed period of time after the start of transmission of a message during which the message can be preempted by a higher priority message. The arbitration window is used in some embodiments for efficiency reasons. For example, if a message has been transmitting for a certain amount of time, it may be a more efficient use of resources to finish the transmission than to preempt it and request that it be resent at a later time. However, in some embodiments, the arbitration window check at 316 is not used. If the arbitration window is not used or has not expired, the node preempts the current message and begins forwarding the new message at 314. In some embodiments, when a message is preempted, the originating node is notified that the message was preempted and should retransmit the message later. For example, in some such embodiments, the originating node is notified of the preemption when it preempts the message itself after receiving a message with a higher priority. However, it is to be understood that other mechanisms can be employed to notify the originating node to retransmit the preempted message.

In this example, if the arbitration window has expired, the node determines at 310 if the maximum message length of the message currently being forwarded or transmitted has been exceeded. As described above, this maximum length check prevents a long message from utilizing the output links for too much time even though the arbitration window has expired. In addition, in some embodiments a maximum length check is used even if an arbitration window is not used. In such embodiments, the check is used to enforce system limits on the maximum message length. In other embodiments, the check at 310 is not used at all. If the node determines that the maximum message length has not been exceeded, the node continues to transmit or forward the current message and blocks propagation of the new message at 312. If the maximum message length of the current message has been exceeded, the node preempts the current message and begins forwarding the new message at 314. The node then returns to 302 when another new message is obtained.

Figure 4:
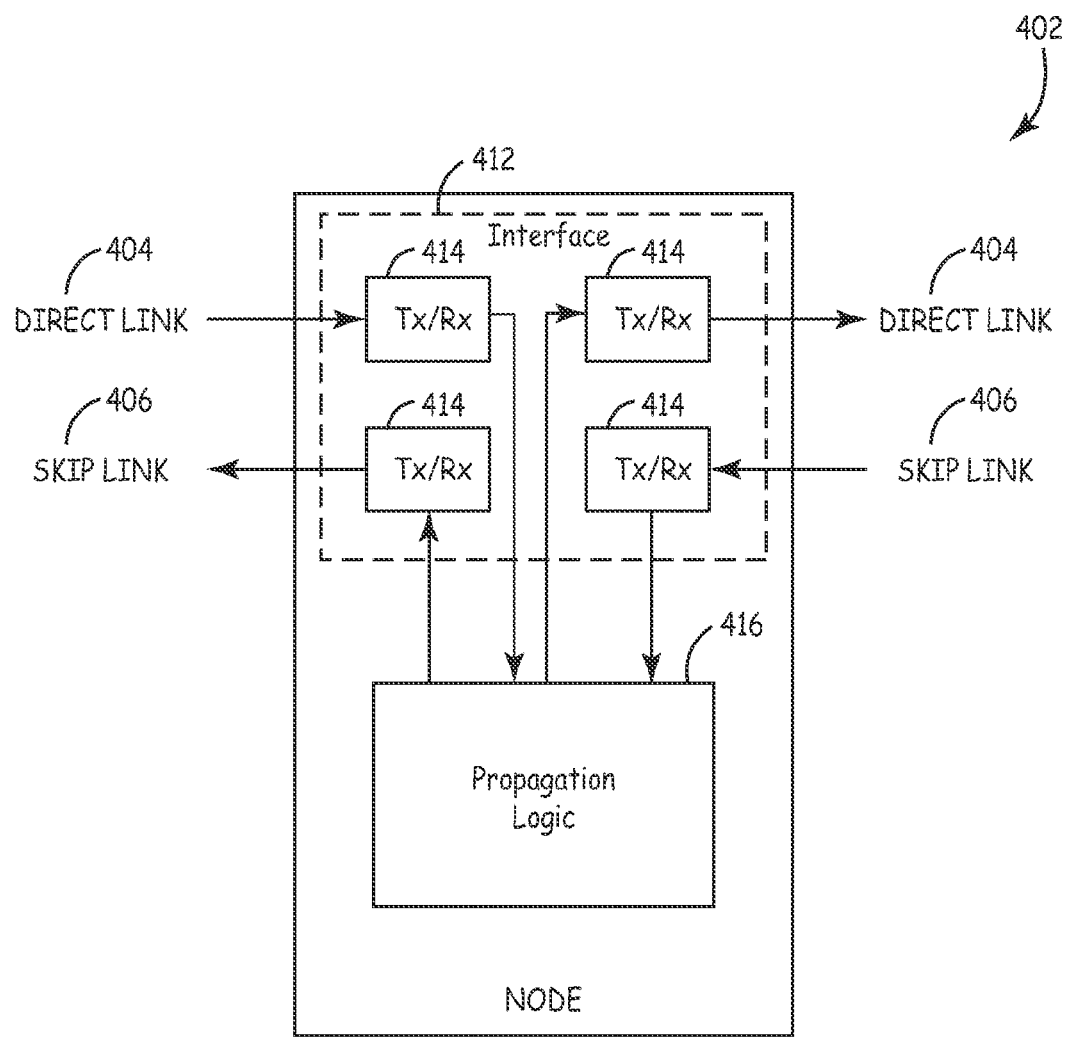
FIG. 4 is a high level block diagram of a half-duplex network node according to one embodiment of the present invention.

FIG. 4 is a high level block diagram of a half-duplex network node 402 according to one embodiment of the present invention. Network node 402 is adapted to be used in a half-duplex communication network such as network 100. Node 402 includes an interface 412 which communicatively couples node 402 to direct links 404 and skip links 406 (e.g. direct links 104 and skip links 106 in FIG. 1). Each of direct links 404 and skip links 406 is configured to carry transmissions in one direction as indicated by arrows in FIG. 4. In this example, direct links 404 are configured to carry transmissions in the direction opposite of skip links 406. In order to support the configuration of link directions, node 402 is adapted to only transmit on one skip link and one direct link in correspondence with the skip and direct link directions. The other skip and direct link are used to receive transmissions from skip and direct neighbor nodes, respectively. Notably, although 4 links are used in this example, it is to be understood that, in other embodiments, other appropriate numbers of links can be used. As described above, each of direct links 404 and skip links 406 is configured to only transmit in one direction to avoid collisions.

Interface 412, in this example, includes four transceivers 414, one transceiver 414 for each direct link 404 and each skip link 406. By using transceivers 414, embodiments of the present invention enable different configurations of link direction for direct links 404 and skip links 406. For example, direct links 404 and skip links 406 can be configured to communicate in the same or opposite directions. In addition, the direction of direct links 404 and skip links 406 can be changed. That is, all direct links 404 and skip links 406 in a network, such as network 100, will carry transmissions in one direction. However, the direction for all the direct links 404 or skip links 406 can be adjusted. The adjustment can be done either manually or automatically.

Coupled to transceivers 414 and interface 412 is propagation logic 416. Propagation logic 416 controls transmission and forwarding of messages. In particular, propagation logic 416 performs the method described above in FIG. 3 in order to arbitrate messages received at node 402. For example, propagation logic 416 is used, in some embodiments, to arbitrate messages based on higher level policies. Higher level policies can include, but are not limited to, bandwidth allocations, and each node's sending frequency, etc. For example, node 402 enforces the maximum message length by shutting down the forwarding of an outgoing message in case the message is longer than allowed in some embodiments. Similarly, in some examples, node 402 blocks propagation of a message if the message's priority or other data indicates that the message is from a node during a certain interval when that node should not send again. This is done to prevent a particular node from transmitting too often. In some such examples, propagation logic 416 waits for the message priority before forwarding a message and only forwards the message if the priority has not been sent too recently. In other such examples, propagation logic 416 forwards the message immediately upon receipt but invalidates the priority of the message, e.g. stops forwarding, if the node has sent a message too recently. Furthermore, in other embodiments, other rules and fairness mechanisms are enforced by propagation logic 416 in node 402.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A half-duplex communication network, comprising:
    a plurality of communication links, each link being configured a priori to communicate in one direction; and
    a plurality of nodes, each node coupled to a first and second direct neighbor nodes and a first and second skip neighbor nodes via the plurality of communication links, wherein each node comprises:
        propagation logic operable to determine which of a first message and a second message to communicate based on at least one of higher level policies and a comparison between a priority of each message, the second message obtained while the first message is being obtained or communicated;
    wherein each node, if not currently communicating a message, is operable to communicate a message without waiting to determine if another node is transmitting another message with a higher priority;
    wherein each of the plurality of nodes further comprises an interface to communicatively couple each node to:
    a direct input link that is communicatively coupled to a first neighbor node in a first direction;
    a skip input link that is communicatively coupled to a first skip neighbor node in a second direction;
    a direct output link that is communicatively coupled to a second direct neighbor node in the first direction; and
    a skip output link that is communicatively coupled to a second skip neighbor node in the second direction.

2. The half-duplex communication network of claim 1, wherein each of the plurality of nodes is operable to forward a received message without waiting for the received message's priority field if not currently communicating a message.

3. The half-duplex communication network of claim 1, wherein each of the plurality of nodes is operable to temporarily store received segments of a message until the node receives the message's priority field.

4. The half-duplex communication network of claim 1, wherein the propagation logic is operable to determine if a message's length exceeds a maximum message length and to preempt the message if the message length exceeds the maximum message length.

5. The half-duplex communication network of claim 1, wherein the propagation logic in each of the plurality of nodes is further operable to preempt a first message to transmit or forward a second message if the priority of the second message is higher than the priority of the first message, and to block propagation of the second message and continue transmitting or forwarding the first message if the priority of the first message is greater than the priority of the second message.

6. The half-duplex communication network of claim 5, wherein the propagation logic is operable to preempt the first message during a fixed time period, wherein, after the fixed time period, the first message is not preempted regardless of the priority of the second message.

7. A node in a half-duplex communication system comprising:
    an interface to communicatively couple the node to:
        a direct input link that is communicatively coupled to a first direct neighbor node;
        a skip input link that is communicatively coupled to a first skip neighbor node;
        a direct output link that is communicatively coupled to a second direct neighbor node; and
        a skip output link that is communicatively coupled to a second skip neighbor node, wherein each of the input and output links is configured to communicate in one direction; and
    propagation logic operable to arbitrate conflicts between a first message and a second message, the second message obtained by the node while the first message is being obtained or communicated by the node, based on at least one of higher level policies and a comparison between a priority of each message,
    wherein the node, if not currently communicating a message, is operable to communicate a message without determining if another node in the half-duplex communication system is transmitting another message with a higher priority.

8. The node of claim 7, wherein the propagation logic temporarily stores a message's data until receiving the message's priority field.

9. The node of claim 7, wherein the propagation logic is operable to determine if the length of a message being communicated exceeds a maximum message length and to preempt the message if the message length exceeds the maximum message length.

10. The node of claim 7, wherein the interface communicatively couples the node to:
    the direct input link that is communicatively coupled to the first direct neighbor node in a first direction;

the skip input link that is communicatively coupled to the first skip neighbor node in a second direction;

the direct output link that is communicatively coupled to the second direct neighbor node in the first direction; and the skip output link that is communicatively coupled to the second skip neighbor node in the second direction.

11. The node of claim 7, wherein the propagation logic is operable to preempt a first message being transmitted over the output links to transmit or forward a second message received over one of the input links if the priority of the second message is greater than the priority of the first message, and block propagation of the second message and continue transmitting or forwarding the first message if the priority of the first message is greater than the priority of the second message.

12. The node of claim 11, wherein the propagation logic is operable to preempt the first message during a fixed time period, wherein, after the fixed time period, the first message is not preempted regardless of the priority of the second message.

13. A method of arbitrating messages in a half-duplex network node comprising an interface to communicatively couple the node to a direct input link that is communicatively coupled to a first direct neighbor node; to a skip input link that is communicatively coupled to a first skip neighbor node; to a direct output link that is communicatively coupled to a second direct neighbor node; and to a skip output link that is communicatively coupled to a second skip neighbor node, the method comprising:

obtaining a new message at the node to communicate over one or more output links;

determine if the node is currently forwarding or transmitting a message;

communicating the new message over the one or more output links, if the node is not currently forwarding or transmitting a message, without waiting to determine if other nodes are concurrently transmitting a message, wherein each of the one or more output links is configured to transmit in one direction;

comparing a priority of the new message to a priority of a current message, if the node is currently forwarding or transmitting a message; and communicating the message with the highest priority over the direct output link in a first direction and over the skip output link in a second direction.

14. The method of claim 13, comparing a priority of the new message to a priority of the current message includes comparing priorities based on higher level policies.

15. The method of claim 13, wherein communicating the message with the highest priority over one or more output link further comprises communicating the message over a direct output link in a first direction and over a skip output link in a second direction.

16. The method of claim 13, wherein communicating the message with the highest priority further comprises:

determining if the current message being communicated exceeds a maximum message length; and preempting the current message if the message exceeds the maximum message length regardless of the current message priority.

17. The method of claim 13, wherein communicating the message with the highest priority further comprises:

preempting the current message to forward the new message if the new message has a higher priority; and blocking propagation of the new message if the current message has a higher priority.

18. The method of claim 17, wherein preempting the current message further comprises:

determining if an arbitration window for the current message has expired;

preempting the current message to forward the new message if the new message has a higher priority and the arbitration window has not expired; and blocking propagation of the new message regardless of the new message's priority if the arbitration window has expired.

* * * * *